Oct. 10, 1961  J. J. MARTIN ET AL  3,004,146
LENS GASKET FOR LAMP ASSEMBLY
Filed Aug. 8, 1958
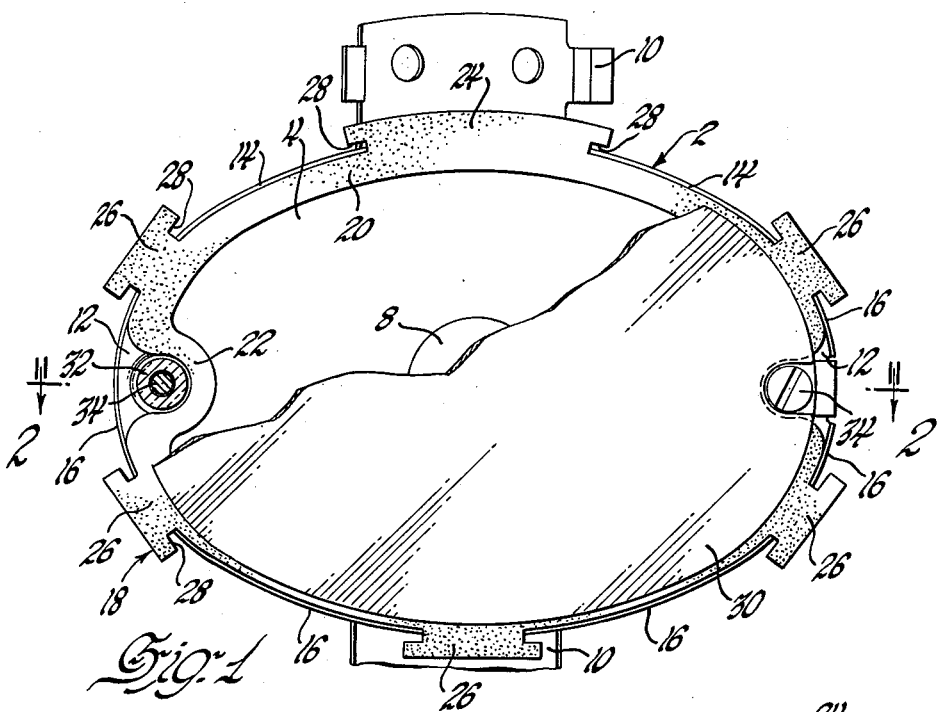
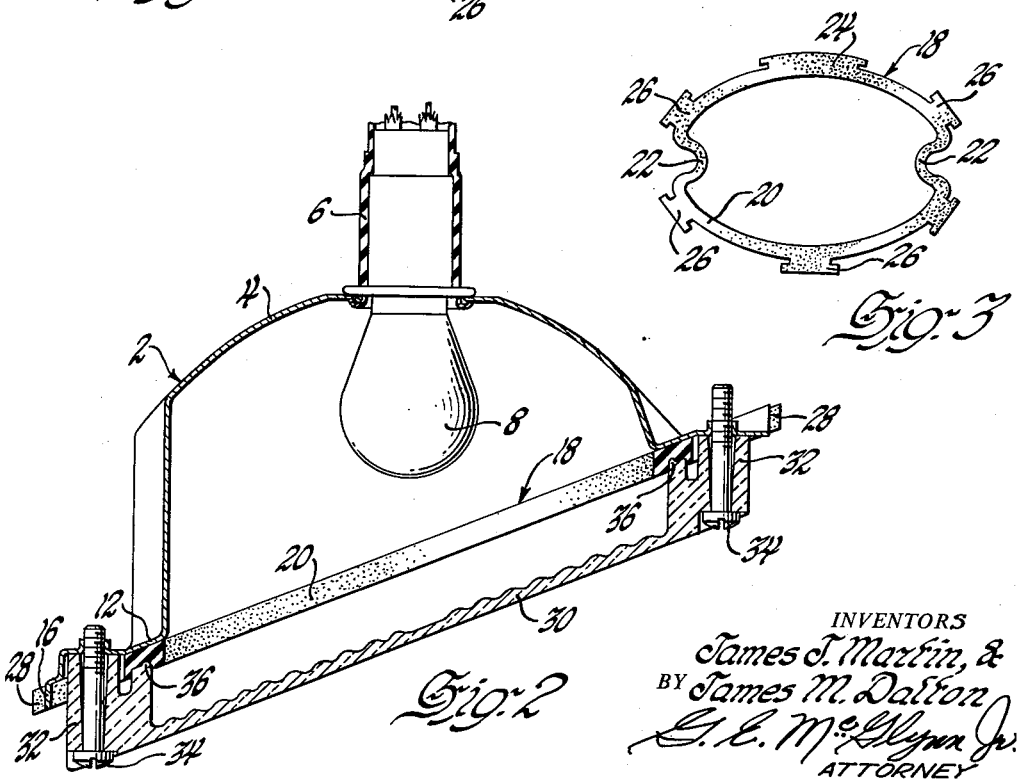
INVENTORS
James J. Martin, &
BY James M. Dalton
G. E. McGlynn Jr.
ATTORNEY 000
United States Patent Office 3,004,146
Patented Oct. 10, 1961

3,004,146
LENS GASKET FOR LAMP ASSEMBLY
James J. Martin, Chesterfield, and James M. Dalton, Anderson, Ind., assignors to General Motors Corporation, Detroit, Mich., a corporation of Delaware
Filed Aug. 8, 1958, Ser. No. 753,951
7 Claims. (Cl. 240—41.55)

This invention relates to gaskets and, in particular, to a gasket of the type normally employed to form a seal between the lens and body of a lamp assembly.

Heretofore it has been the conventional practice to interpose a suitable gasket between the peripheral mounting flange of a lamp body and a sealing flange carried by a lamp lens which is suitably secured to the body. Usually, the lens has been secured to the body by two or more mounting screws so as to firmly engage and compress the gasket in forming a tight seal for the interior of the lamp assembly. Sponge rubber and cork are two of the more common types of gasket materials which have been employed in this environment, although it will be obvious that other well-known gasket materials can be employed.

Inasmuch as gaskets made of the typical type of materials mentioned above are relatively flexible and hard to handle, it has usually been desirable to cement the gasket to the lamp body to facilitate the assembly operation. Moreover, cementing ordinarily results in a good mechanical connection of the gasket to the lamp body thereby enhancing the effectiveness of the seal.

However, a problem has been presented particularly where the sealing flange of the lamp which directly engages the gasket is relatively narrow. Under such circumstances it has been found that the relatively great compressive force imposed on the gasket by the lens tends to squeeze the gasket radially inwardly toward the body cavity in which the lamp source is mounted. This force is sufficient to break even the mechanical connection afforded by a cemented gasket. The result is an ineffective seal.

It is, therefore, a principal object and feature of this invention to provide an improved gasket for a body member, and which gasket includes means which will prevent it from being displaced from a sealing position upon a compressive force being applied thereto.

It is yet another object and feature of this invention to provide a lens gasket for a lamp body, and which gasket includes means for preassembling, locating and maintaining the gasket on the body while preventing the gasket from being squeezed radially inwardly of the body upon mounting the lens thereagainst.

In general, these and other objects of the invention are attained in a lamp assembly comprising a lamp body having a peripheral substantially radially projecting mounting flange from which there project axially a plurality of spaced locking flanges. The mounting flange together with the spaced locking flanges form a seat to receive in nesting relationship therewith a lens gasket having a main body portion resting against the mounting flange in outward radial abutment with the locking flanges, and plural radially projecting integral lugs which extend through the spaces between the locking flanges. These lugs are so shaped with respect to the spacing of the locking flanges to locate the gasket properly on the lamp body. Moreover, the aforementioned lugs are provided with suitably shaped shoulder means for engaging radially the exterior surface of the spaced locking flanges to hold the gasket on its seat while preventing the gasket from being squeezed radially inwardly of the lamp body upon seating the lens thereagainst with considerable compressive force.

These and other objects and features of this invention will become more apparent hereinafter as the description of the invention proceeds, and in which reference is made to the following drawing in which:

FIGURE 1 is a front view of a lamp assembly equipped with the invention, parts being broken away and in section to illustrate certain details;

FIGURE 2 is a section taken on line 2—2 of FIGURE 1; and

FIGURE 3 is a plan view of the gasket in reduced scale.

Referring now to the drawing, a lamp assembly 2 comprises a generally cup-shaped metal body member 4 having suitably secured to the base thereof a socket assembly 6. Inasmuch as the socket assembly is of conventional construction and in and of itself forms no part of this invention, it will suffice to observe that it includes a contact structure suitably electrically connected by conductors to a source of power such as an automotive vehicle battery. The base of the conventional light bulb 8 is removably mounted within the socket assembly 6, and includes suitable contacts for cooperation with the socket contacts. Suitable means, such as brackets 10 secured to or formed integral with body member 4 serve to mount the assembly on the vehicle.

At its forward open end, the lamp body is provided with a substantially radial peripheral mounting flange 12 from which the plural spaced integral locking flanges 14 and 16 project substantially axially. It will be noted that the spacing between two adjacent locking flanges 14 is greater than the spacing between the flanges 16 and between the latter and flange 14 all for a purpose to appear more fully hereinafter.

A lens gasket 18 includes a main body portion 20, the greater portion of which is adapted to rest or nest against the mounting flange 12 in radially outwardly abutting relationship with each of the locking flanges 14 and 16. Opposite bowed portions 22 are provided for a purpose to be described. The gasket also includes a plurality of peripherally spaced radially projecting substantially T-shaped locking lugs 24 and 26 which project through the respective spaces between adjacent locking flanges. It will be noted that the single locking lug 24 is wider than the other lugs so as to be received within the larger space between the locking flanges 14. Thus, the gasket is suitably located or positioned with respect to the lamp body and lens to be described. The aforementioned T-shaped locking lugs also provide oppositely extending shoulders 28 in the plane of adjacent locking flanges to abut the exterior surface of the latter in limiting radial inward movement of the lens gasket.

The lamp lens 30 includes opposite bosses 32 resting on the lamp body mounting flange 12 to receive a suitable fastener such as the screws 34 to maintain the lens on the body. It will be noted that the bowed gasket portions 22 curve around bosses 32. Additionally, the lens is provided with an inward projection or sealing flange 36 abutting the main body portion 20 of the gasket 18.

In assembling the gasket on the lamp body, it will be appreciated that the larger lug 24 is received between locking flanges 14 to the gasket on the body. The shoulder means 28 on each of the lugs insures that the gasket will remain in position on the body during the subsequent assembly operations. In assembling the lens to the body, the sealing flange 36 is placed in abutment with the main body portion 20 of the gasket and the mounting screws 34 then inserted through the lens and the body. In compressing the lens sealing flange 36 against the gasket, considerable pressure is employed. However, any tendency for the gasket to be squeezed to an objectionable extent radially inwardly toward the cavity or depression of the lamp body is limited by abutment of the shoulder means 28 of each locking lug with the exterior surface of the respective locking flanges 14 and 16.

It will be seen that a lens gasket constructed as aforedescribed includes means to facilitate the assembly operation by maintaining the gasket on its seat in the lamp body, while such means further acts to prevent the pressure applied by the lens on the gasket from squeezing the latter to an objectionable extent radially inwardly of the lamp body although no cement or other mechanical bonding material is employed.

Having disclosed a preferred form of the invention, such description should be understood to be by way of illustration only, and in no way is intended to limit the scope of the invention which is defined by the claims which follow.

We claim:

1. In combination, a lamp body, a gasket mounting seat on said body including a mounting flange and a pair of spaced locking flanges extending out of the plane of said mounting flange, a gasket mountable on said seat, a lug on said gasket projecting through the space between said locking flanges, and shoulder means on said lug abuttable with at least one of said locking flanges.

2. In combination, a lamp body, a gasket mounting seat on said body including a substantially radial mounting flange and a pair of spaced substantially axially extending locking flanges, a gasket mountable on said seat, a lug on said gasket projecting radially through the space between said locking flanges, and shoulder means on said lug abuttable with at least one of said locking flanges.

3. In combination, a lamp body, a gasket mounting seat on said body including a substantially radial mounting flange and a pair of spaced substantially axially extending locking flanges formed integral with said mounting flange, a gasket mountable on said seat, an integral lug on said gasket projecting radially through the space between said axial flanges, and shoulder means on said lug abuttable with said locking flanges.

4. In combination, a lamp body, a peripheral mounting flange on said body, plural spaced locking flanges formed integral with said mounting flange and projecting out of the plane of the latter, a lens gasket nested against said mounting flange and said locking flanges, plural spaced locking lugs formed integral with said gasket and extending through the spaces between adjacent locking flanges, said lugs including shoulder means abuttable with the exterior surface of at least one of said locking flanges, a lens, and means securing said lens to said body against said gasket.

5. In combination, a lamp body, a substantially radial peripheral mounting flange on said body, plural spaced locking flanges formed integral with said mounting flange and projecting substantially axially from the latter, a lens gasket nested against said mounting flange and said locking flanges, plural spaced locking lugs formed integral with said gasket and extending radially through the spaces between adjacent locking flanges, said lugs including shoulder means radially abuttable with the exterior surface of said locking flanges, a lens, and means securing said lens to said body against said gasket.

6. In combination, a lamp body, a mounting flange on said body, a plurality of spaced locking flanges formed integral with said mounting flange and projecting out of the plane of the latter, a lens gasket mountable on said mounting flange, plural spaced locking lugs formed integral with said gasket and extending through the spaces between adjacent locking flanges, at least one of said lugs being of a different size than the other of said lugs for cooperation with correspondingly spaced locking flanges to locate said gasket on said body, each of said lugs including shoulder means abuttable with the exterior surface of said locking flanges, a lens engageable with said gasket, and means for securing said lens to said body with said lens compressed against said gasket.

7. In combination, a lamp body, a peripheral substantially radial mounting flange on said body surrounding and delineating a depression in the latter, a light source secured to said body within said depression, a plurality of spaced locking flanges formed integral with said mounting flange and projecting substantially axially from the latter, a lens gasket mountable on said mounting flange in outward radial abutment with said locking flanges, plural spaced locking lugs formed integral with said gasket and extending radially through the spaces between adjacent locking flanges, at least one of said lugs being of a different size than the other of said lugs for cooperation with correspondingly spaced locking flanges to locate said gasket on said body, each of said lugs including shoulder means abuttable radially inwardly with the exterior surface of said locking flanges, a lens engageable with said gasket, and means for securing said lens to said body with said lens compressed against said gasket.

References Cited in the file of this patent

UNITED STATES PATENTS

| | | |
|---|---|---|
| 2,455,107 | Beals | Nov. 30, 1948 |
| 2,785,824 | Reeves | Mar. 19, 1957 |
| 2,801,764 | Russell et al. | Aug. 6, 1957 |
| 2,814,720 | Martin | Nov. 26, 1957 |
| 2,906,566 | Sale | Sept. 29, 1959 |

FOREIGN PATENTS

| | | |
|---|---|---|
| 202,096 | Switzerland | Apr. 1, 1939 |